UNITED STATES PATENT OFFICE.

PARKER C. McILHINEY, OF GREAT NECK, NEW YORK.

PROCESS FOR OBTAINING ALUMINUM.

1,083,691.

Specification of Letters Patent.

Patented Jan. 6, 1914.

No Drawing.

Application filed August 18, 1913. Serial No. 785,382.

*To all whom it may concern:*

Be it known that I, PARKER C. McILHINEY, a citizen of the United States, and a resident of Great Neck, North Hempstead, Nassau county, State of New York, have invented certain new and useful Improvements in Processes for Obtaining Aluminum, of which the following is a specification.

My invention relates to improvements in processes for obtaining metallic aluminum from its ores, and in one form it comprehends also the obtaining in a profitable manner of a valuable by-product.

Aluminum has been extracted heretofore from the oxid, alumina (made from the ore by a separate operation), by dissolving the oxid in a bath of molten fluorids and passing an electric current through the resulting liquid, whereupon metallic aluminum and oxygen are separated and aluminum is obtained in the metallic form.

In my process in its preferred form, I add to the bath of molten fluorids the fluorid of aluminum instead of the oxid, and at the same time act upon the fluorid with steam, whereby there is a ready reaction between the aluminum fluorid and the steam with the production of alumina, *i. e.*, the oxid of aluminum, and hydrofluoric acid which acid is carried away together with any excess of water vapor and condensed for further use, while the alumina or oxid of aluminum remains dissolved in the bath of molten fluorids to be decomposed as heretofore for the recovery of the metallic aluminum. Aluminum occurs widely distributed in nature in feldspar, clay, bauxite, etc., and generally associated or combined with silica.

In carrying out my process, I may use as a base feldspar (orthoclase) the double silicate of aluminum and potassium and treat this with aqueous hydrofluoric acid. The insoluble potassium silico fluorid and that part of the silica which is insoluble are separated from the solution containing the aluminum, and the solution neutralized as by adding clay, bauxite, etc., whereby the remaining silica is precipitated and a solution of aluminum fluorid obtained. The potassium silico-fluorid is heated to a red heat with calcium sulfate, to produce potassium sulfate which may be leached out so that the potash is obtained in suitable form for fertilizer, etc., in a manner well understood by those skilled in the art. Instead of using orthoclase, a pulverized mineral such as clay may be treated with aqueous hydrofluoric acid until the solution is neutral, to produce a solution of aluminum fluorid which is then separated from the silica and other deleterious impurities. From these solutions of aluminum fluorid I then separate the aluminum fluorid by evaporation, refrigeration, or by other suitable means, and so obtain a solid aluminum fluorid. This solid aluminum fluorid (which may or may not contain water of crystallization) I then add directly to the molten bath. The bath preferably consists of a mixture of aluminum fluorid and cryolite, the sodium in the cryolite being more electropositive than aluminum. The aluminum fluorid is fed substantially continuously into a closed compartment covering a part of the molten bath. A suitable steam jet is directed into this closed compartment near the surface of the bath and the water in the form of steam or water vapor is allowed to act upon the molten fluorids or the aluminum fluorid as it is entering the bath. The water reacts very readily with the aluminum fluorid on account of the excess of the aluminum fluorid constantly present, for no particular portion of aluminum fluorid need be completely converted into oxid by the steam although the supply of steam must be such as to convert into oxid in a given time the amount of aluminum fluorid introduced in the same time.

The presence in the bath consisting of molten fluorids of a considerable amount of undecomposed aluminum fluorid is not detrimental but is on the contrary advantageous. The electrolysis of the bath being kept up in a well known manner, metallic aluminum is produced which may be drawn off in any suitable manner.

In case anhydrous aluminum fluorid is used, the amount of water which is used would necessarily be greater than if the hydrated crystals were used, while if the hydrated aluminum fluorid contain sufficient water it may be possible to omit the separate application of the steam. The closed compartment is provided with an exit for the hydrofluoric acid produced by the reaction of the aluminum fluorid with the steam which is injected into or upon the molten bath under the closed compartment. This hydrofluoric acid either directly or added to the mother liquor obtained upon separating out the crystals of aluminum fluorid, may be used to treat a fresh portion of feldspar, clay or the like.

Since a bath containing aluminum oxid is operative at far less voltage than a bath entirely of fluorids the production of the oxid in the bath, as described, is extremely advantageous. Moreover, since this action occurs in the same bath in which the electrolytic action takes place, both time and apparatus are economized and the metallic aluminum is produced in a most efficient manner, by an extremely simple process. By obtaining the potash as a by-product greater profit is obtained and the fluorin may also be recovered from the potash end of the process.

Having fully and clearly described my invention, what I claim as new and desire to secure by Letters Patent, is:

1. The process of obtaining aluminum from aluminum bearing silicious material, which consists in treating the silicious material with hydrofluoric acid to produce aluminum fluorid, electrolyzing an electrolytic bath and adding the aluminum fluorid to the bath, together with water or steam, to obtain metallic aluminum and hydrofluoric acid, and treating fresh portions of the silicious material with the hydrofluoric acid obtained from the bath to obtain fresh portions of aluminum fluorid to be added to the bath.

2. The process of obtaining aluminum and potash which consists in treating feldspar with aqueous hydrofluoric acid, separating in solid form the aluminum fluorid formed, treating the potassium silicofluorid formed to obtain potash, electrolyzing a fused electrolytic bath and adding the solid aluminum fluorid thereto together with steam or water to obtain metallic aluminum and hydrofluoric acid, and treating fresh portions of feldspar with the hydrofluoric acid obtained from the bath to obtain fresh portions of solid aluminum fluorid to be added to the bath.

3. The process of obtaining aluminum from its ores, which consists in treating the ore with aqueous hydrofluoric acid to produce aluminum fluorid, separating the aluminum fluorid and adding it to a fused mixture of fluorids of aluminum and a fluxing ingredient and at the same time adding water or steam in sufficient quantity and in such manner as to react with the aluminum fluorid to produce hydrofluoric acid and aluminum oxid, electrolyzing the fused mixture to obtain metallic aluminum, and treating fresh portions of the ore with the hydrofluoric acid obtained from the bath to obtain fresh portions of aluminum fluorid.

4. The process of obtaining aluminum, which consists in adding aluminum fluorid in solid form to an electrolytic bath comprising a fused mixture of fluorid of aluminum and a fluxing ingredient and at the same time adding water or steam in sufficient quantity and in such manner as to react with the fluorid to produce aluminum oxid and hydrofluoric acid, and electrolyzing the bath with continued additions of aluminum fluorid to obtain metallic aluminum.

5. The process of obtaining aluminum, which consists in adding aluminum fluorid to an electrolytic bath comprising a fused mixture of fluorids of aluminum and a metal more electropositive than aluminum and at the same time adding water or steam in sufficient quantity and in such manner as to react with the fluorid to produce aluminum oxid and hydrofluoric acid, and electrolyzing the bath with continued additions of aluminum fluorid and water to obtain metallic aluminum and hydrofluoric acid.

6. The process of obtaining aluminum, which consists in adding aluminum fluorid to an electrolytic bath comprising a fused mixture of fluorid of aluminum and a fluxing ingredient and at the same time adding a reagent in sufficient quantity and in such manner as to react with the fluorid to produce hydrofluoric acid and aluminum oxid, and electrolyzing the bath with substantially continuous additions of aluminum fluorid and said reagent to obtain metallic aluminum and hydrofluoric acid.

7. The process of obtaining metallic aluminum, which consists in electrolyzing a fused mixture of the fluorids of aluminum and another metal more electropositive than aluminum and at the same time feeding to the fused bath aluminum fluorid and water as vapor or steam in sufficient quantity and in such manner as to react with the fluorid to produce aluminum oxid and hydrofluoric acid.

8. The process of obtaining metallic aluminum, which consists in electrolyzing a fused mixture of the fluorids of aluminum and a fluxing reagent and at the same time adding a reagent in sufficient quantity and in such manner as to react with the fluorid to produce hydrofluoric acid and aluminum oxid.

In testimony whereof, I have signed my name to this specification, in the presence of two subscribing witnesses.

PARKER C. McILHINEY.

Witnesses:
GORHAM CROSBY,
EDWIN SEGER.